US00RE40058E

(19) United States
(12) Reissued Patent
Umezawa et al.

(10) Patent Number: US RE40,058 E
(45) Date of Reissued Patent: Feb. 12, 2008

(54) TONER BOTTLE CAPABLE OF BEING DISCRIMINATED, METHOD AND APPARATUS FOR DISCRIMINATING TONER BOTTLE TYPES ACCORDING TO A SENSED OBJECT ON THE TONER BOTTLE STIRRING TONER, AND DETECTING THE AMOUNT OF REMAINING TONER

(75) Inventors: Noriyuki Umezawa, Tokyo (JP); Takayuki Nishi, Tokyo (JP); Yoshiharu Taniyama, Tokyo (JP); Shinichi Itoh, Tokyo (JP)

(73) Assignee: Toshiba Tec Kabushiki Kaisha, Tokyo (JP)

(21) Appl. No.: 10/658,849

(22) Filed: Sep. 10, 2003

Related U.S. Patent Documents

Reissue of:
(64) Patent No.: 6,289,182
Issued: Sep. 11, 2001
Appl. No.: 09/506,370
Filed: Feb. 18, 2000

(51) Int. Cl.
*G03G 15/00* (2006.01)
*G03G 15/08* (2006.01)

(52) U.S. Cl. ..... 399/12; 399/12
(58) Field of Classification Search ..... 399/27, 399/262
See application file for complete search history.

(56) References Cited

U.S. PATENT DOCUMENTS

| | | | |
|---|---|---|---|
| 3,581,949 | A | 6/1971 | Conrad et al. |
| 3,669,072 | A | 6/1972 | Reynolds et al. |
| 3,721,360 | A | 3/1973 | Collie |
| 4,060,105 | A | 11/1977 | Feldeisen et al. |
| 4,436,414 | A | 3/1984 | Kamiyama et al. |
| 4,740,808 | A | 4/1988 | Kassamura et al. |
| 4,878,603 | A | 11/1989 | Ikesue et al. |
| 4,961,088 | A | 10/1990 | Gilliland et al. |
| 4,963,939 | A | 10/1990 | Kurando et al. |
| 4,978,995 | A | 12/1990 | Takahashi |
| 5,088,144 | A | 2/1992 | Schneider |
| 5,208,637 | A | 5/1993 | Landa |
| 5,296,900 | A | 3/1994 | Saijo et al. |
| 5,319,426 | A | 6/1994 | Baruch et al. |
| 5,331,381 | A | 7/1994 | Ota et al. |
| 5,441,177 | A | 8/1995 | Yanagisawa |

(Continued)

FOREIGN PATENT DOCUMENTS

| | | |
|---|---|---|
| DE | 299 06 174 U1 | 8/1999 |
| DE | 299 14 516 U1 | 1/2000 |

(Continued)

OTHER PUBLICATIONS

U.S. Appl. No. 10/745,475, filed Dec. 24, 2003, Ise.
U.S. Appl. No. 10/691,436, filed Oct. 22, 2003, Taniyama et al.

*Primary Examiner*—Quana Grainger
(74) *Attorney, Agent, or Firm*—Foley & Lardner LLP

(57) ABSTRACT

A method and apparatus for discriminating bottle types, for stirring the toner, and for detecting the amount of toner remaining in the toner bottle. A toner bottle is adapted to fit the apparatus for discriminating toner bottle types, and a toner bottle is adapted for the apparatus for stirring toner. The genuineness of the toner bottle product is checked by sensing a rib assumed to be formed with a predetermined length on the outer surface of the toner bottle. Toner is stirred by continuously rotating the toner bottle in forward and reverse directions. The toner bottle can be easily rotated in the forward and reverse directions by sensing the rib of the toner bottle by using the sensor. Since the load of rotation of the toner bottle changes in accordance with the amount of remaining toner, the rotational speed of the toner bottle is sensed by using the sensor to check whether toner is close to empty.

31 Claims, 8 Drawing Sheets

U.S. PATENT DOCUMENTS

| | | | |
|---|---|---|---|
| 5,455,662 | A | 10/1995 | Ichikawa et al. |
| 5,475,469 | A | 12/1995 | Okada et al. |
| 5,500,719 | A | 3/1996 | Ichikawa et al. |
| 5,528,349 | A | 6/1996 | Satake |
| 5,534,988 | A | 7/1996 | Gerbasi |
| 5,541,715 | A | 7/1996 | Katoh et al. |
| 5,557,381 | A | 9/1996 | Sakamoto et al. |
| 5,585,899 | A | 12/1996 | Palumbo et al. |
| 5,589,915 | A | 12/1996 | Hashimoto |
| 5,627,631 | A | 5/1997 | Ichikawa et al. |
| 5,737,668 | A | 4/1998 | Johroku |
| 5,761,566 | A | 6/1998 | Suzuki et al. |
| 5,774,772 | A | 6/1998 | Kai et al. |
| 5,774,773 | A | 6/1998 | Otsuka et al. |
| 5,794,108 | A | 8/1998 | Yoshizawa et al. |
| 5,812,915 | A | 9/1998 | Farkash |
| 5,857,129 | A | 1/1999 | Harris |
| 5,867,757 | A | 2/1999 | Okazaki et al. |
| 5,890,040 | A | 3/1999 | Matsuoka et al. |
| 5,907,756 | A | 5/1999 | Shirota et al. |
| 5,908,124 | A | 6/1999 | Klauke et al. |
| 5,909,610 | A | 6/1999 | Yoshiki et al. |
| 5,918,090 | A | 6/1999 | Ichikawa et al. |
| 5,918,095 | A | 6/1999 | Huang |
| 5,966,574 | A | 10/1999 | Ui et al. |
| 5,970,273 | A | 10/1999 | Zenk et al. |
| 5,970,290 | A | 10/1999 | Yoshiki et al. |
| 5,970,291 | A | 10/1999 | Miller |
| 5,970,293 | A | 10/1999 | Huang |
| 5,983,059 | A | 11/1999 | Oka et al. |
| 5,991,584 | A | 11/1999 | Meyer et al. |
| 5,999,759 | A | 12/1999 | Palumbo et al. |
| 6,019,461 | A | 2/2000 | Yoshimura et al. |
| 6,032,010 | A | 2/2000 | Kim et al. |
| 6,032,013 | A | 2/2000 | Niizawa |
| 6,038,422 | A | 3/2000 | Loewel |
| 6,064,846 | A | 5/2000 | Wang et al. |
| 6,067,423 | A | 5/2000 | Smith et al. |
| 6,067,432 | A | 5/2000 | Huang |
| 6,075,963 | A | 6/2000 | Ichikawa et al. |
| 6,091,920 | A | 7/2000 | Kita et al. |
| 6,097,903 | A | 8/2000 | Yahata et al. |
| 6,104,902 | A | 8/2000 | Meyer et al. |
| 6,118,951 | A | 9/2000 | Kato et al. ..... 399/27 |
| 6,128,453 | A | 10/2000 | Ban et al. |
| 6,134,411 | A | 10/2000 | Meyer et al. |
| 6,137,972 | A | 10/2000 | Playfair et al. |
| 6,151,459 | A | 11/2000 | Hashimoto et al. |
| 6,188,859 | B1 | 2/2001 | Wang et al. |
| 6,229,976 | B1 | 5/2001 | Kimura |
| 6,229,977 | B1 | 5/2001 | Wang et al. |
| 6,233,421 | B1 | 5/2001 | Wang et al. |
| 6,240,262 | B1 | 5/2001 | Taniyama et al. |
| 6,256,469 | B1 | 7/2001 | Taniyama et al. |
| 6,256,470 | B1 | 7/2001 | Taniyama et al. |
| 6,259,877 | B1 | 7/2001 | Taniyama et al. |
| 6,289,182 | B1 | 9/2001 | Umezawa et al. |
| 6,308,017 | B1 | 10/2001 | Taniyama et al. |
| 6,308,036 | B1 | 10/2001 | Taniyama et al. |
| 6,334,037 | B1 | 12/2001 | Ise |
| 6,337,965 | B1 | 1/2002 | Muramatsu |
| 6,343,883 | B1 | 2/2002 | Tada et al. |
| 6,347,195 | B1 | 2/2002 | Saiki et al. |
| 6,405,011 | B1 | 6/2002 | Wang et al. |
| 6,421,139 | B1 | 7/2002 | Takami et al. ..... 358/1.2 |
| 6,477,335 | B1 | 11/2002 | Surya et al. |
| 6,505,006 | B1 | 1/2003 | Solanki et al. |
| 6,542,709 | B1 | 4/2003 | Wang et al. |

FOREIGN PATENT DOCUMENTS

| | | |
|---|---|---|
| DE | 201 10 369 U1 | 10/2001 |
| DE | 202 06 622 U1 | 10/2002 |
| JP | 60-101571 | 6/1985 |
| JP | 60-153066 | 8/1985 |
| JP | 61-99176 | 5/1986 |
| JP | 61-215575 | 9/1986 |
| JP | 62-173482 | 7/1987 |
| JP | 63-75769 | 4/1988 |
| JP | 63-82493 | 4/1988 |
| JP | 63-94267 | 4/1988 |
| JP | 63-224986 | 9/1988 |
| JP | 1-255875 | 10/1989 |
| JP | 2-146666 U | 12/1990 |
| JP | 3-2369 | 1/1991 |
| JP | 3-153271 | 7/1991 |
| JP | 4-477 | 1/1992 |
| JP | 4-1682 | 1/1992 |
| JP | 4-60669 | 2/1992 |
| JP | 4-62564 | 2/1992 |
| JP | 5-224479 | 9/1993 |
| JP | 5-81855 U | 11/1993 |
| JP | 5-333749 | 12/1993 |
| JP | 6-35320 | 2/1994 |
| JP | 6-149047 | 5/1994 |
| JP | 6-149048 | 5/1994 |
| JP | 6-149051 | 5/1994 |
| JP | 6-149061 | 5/1994 |
| JP | 6-266227 | 9/1994 |
| JP | 6-316060 | 11/1994 |
| JP | 7-20703 | 1/1995 |
| JP | 7-181788 | 7/1995 |
| JP | 7-191539 | 7/1995 |
| JP | 7-199574 | 8/1995 |
| JP | 7-199618 | 8/1995 |
| JP | 8-137364 | 5/1996 |
| JP | 9-90727 | 4/1997 |
| JP | 9-185311 | 7/1997 |
| JP | 9-211947 | 8/1997 |
| JP | 9-211977 | 8/1997 |
| JP | 9-244369 | 9/1997 |
| JP | 10-20642 | 1/1998 |
| JP | 10-48936 | 2/1998 |
| JP | 10-171231 | 6/1998 |
| JP | 10-213957 | 8/1998 |
| JP | 10-260574 | 9/1998 |
| JP | 10-319705 | 12/1998 |
| JP | 11-65252 | 3/1999 |
| JP | 11-65390 | 3/1999 |
| JP | 11-184232 | 7/1999 |
| JP | 11-327271 A | 11/1999 |
| JP | 11-327272 | 11/1999 |
| JP | 11-338210 | 12/1999 |
| JP | 2000-19828 | 1/2000 |
| JP | 2000-47466 | 2/2000 |
| JP | 2000-221866 | 8/2000 |
| JP | 2000-321860 | 11/2000 |
| JP | 2000-347503 | 12/2000 |
| JP | 2001-092229 A | 4/2001 |
| JP | 2001-117458 | 4/2001 |
| JP | 2001-175080 | 6/2001 |
| JP | 2001-228692 A | 8/2001 |
| JP | 2001-235934 A | 8/2001 |
| TW | 450900 | 6/1998 |
| TW | 467298 | 1/2000 |
| TW | 431308 | 5/2000 |

TONER BOTTLE CAPABLE OF BEING DISCRIMINATED, METHOD AND APPARATUS FOR DISCRIMINATING TONER BOTTLE TYPES ACCORDING TO A SENSED OBJECT ON THE TONER BOTTLE STIRRING TONER, AND DETECTING THE AMOUNT OF REMAINING TONER

Matter enclosed in heavy brackets [ ] appears in the original patent but forms no part of this reissue specification; matter printed in italics indicates the additions made by reissue.

BACKGROUND OF THE INVENTION

The present invention relates to a method and apparatus for discriminating toner bottle types, stirring toner, and detecting the amount of remaining toner, a toner bottle adapted to fit the apparatus for discriminating toner bottle types, and a toner bottle adapted for the apparatus for stirring toner.

A copying machine using a laser beam performs a copying process in which the surface of a photosensitive drum is negatively charged and exposed to a laser beam on the basis of an image signal, negatively charged toner is attracted to the exposed portion to form a visual image, and this visual image is transferred onto a transfer sheet and fixed on it.

To replenish the copying machine with toner, a toner bottle containing toner and a driving unit for rotating this toner bottle are used.

However, conventional copying machines have the following several problems about a toner bottle.

First, it is impossible to reliably eliminate the use of toner bottles other than genuine products by a simple method.

Second, it is necessary to stir toner in order to prevent inclination and gathering of toner in a toner bottle and thereby stabilize the replenishment. However, stirring of toner cannot be performed by a simple method.

Third, the amount of remaining toner in a toner bottle cannot be detected in real time. Conventionally, the amount of remaining toner is detected by, e.g., the following method. When a developing unit containing toner and a carrier for charging the toner detects a deficiency of the toner amount, it outputs a signal for requesting replenishment of toner from a toner bottle. If the deficiency of the toner amount does not improve although the signal is output three times, empty indication is performed to indicate that the toner bottle is empty.

However, this method cannot detect a toner deficiency in a toner bottle in real time. Hence, in some cases a toner deficiency is suddenly indicated and copying is interrupted during copying a large quantity of sheets. If this is the case, the operation is kept interrupted while the user who has started this large-quantity copying is away from the copying machine.

SUMMARY OF THE INVENTION

It is, therefore, the first object of the present invention to reliably eliminate the use of toner bottles other than genuine products by a simple method.

It is the second object of the present invention to stir toner in a toner bottle by a simple method.

It is the third object of the present invention to detect a toner deficiency in a toner bottle in real time to inform it before toner empty indication is performed, thereby improving the efficiency of copying.

According to the present invention, there is provided a method of discriminating toner bottle types, comprising the object sensing step of rotating a toner bottle, sensing an object to be sensed formed on an outer surface of the toner bottle and, if the object is not sensed, outputting information indicating abnormality, and the ratio discrimination step of checking, if the object is sensed, whether the object is formed at a predetermined ratio on the outer surface of the toner bottle, outputting information indicating abnormality if the object is not formed at the predetermined ratio, and outputting information indicating normality if the object is formed at the predetermined ratio.

In this method, the object ratio discrimination step can comprise the steps of detecting a first time interval from the timing at which the sensor senses one end portion of the object of the toner bottle in rotation to the timing at which the sensor senses the other end portion, detecting a second time interval from the timing at which the sensor senses the other end portion of the object to the timing at which the sensor senses the one end portion, and checking whether the object is formed over a predetermined length on the outer surface of the toner bottle by using the first and second time intervals.

In this method, the object ratio discrimination step may be performed with reference to the timing at which a first end portion of the object of the toner bottle in rotation is sensed and the timing at which a second end portion of the object is sensed.

An apparatus for discriminating toner bottle types according to the present invention comprises a motor for rotating a toner bottle, a motor driver for driving the motor, a sensor for sensing an object to be sensed formed in a predetermined portion of the toner bottle and outputting a sensor signal, and a CPU for controlling the motor driver and discriminating the toner bottle by using the sensor signal, wherein the CPU rotates the toner bottle by controlling the motor driver, senses the object assumed to be formed on an outer surface of the toner bottle by using the sensor, outputs information indicating abnormality if the object is not sensed, checks, if the object is sensed, whether the object is formed at a predetermined ratio on the outer surface of the toner bottle, outputs information indicating abnormality if the object is not formed at the predetermined ratio, and outputs information indicating normality if the object is formed at the predetermined ratio.

In order to check whether the object is formed at the predetermined ratio on the outer surface of the toner bottle, the CPU can detect a first time interval from the timing at which the sensor senses one end portion of the object of the toner bottle in rotation to the timing at which the sensor senses the other end portion, detect a second time interval from the timing at which the sensor senses the other end portion of the object to the timing at which the sensor senses the one end portion, and check whether the object is formed at the predetermined ratio on the outer surface of the toner bottle by using the first and second time intervals.

A toner bottle according to the present invention is so formed as to be adapted to fit the toner bottle type discriminating apparatus described above.

A method of stirring toner according to the present invention comprises the steps of rotating a toner bottle through a predetermined angle in a forward direction, and rotating the toner bottle through a predetermined angle in a reverse direction.

A method of stirring toner and discriminating toner bottle types according to the present invention comprises the steps of rotating a toner bottle through a predetermined angle in a forward direction, sensing an object to be sensed assumed to be formed on an outer surface of the toner bottle and, if the object is not sensed, outputting information indicating abnormality, and rotating the toner bottle through a predetermined angle in a reverse direction, sensing the object by using the sensor and, if the object is not sensed, outputting information indicating abnormality, wherein toner is stirred by rotating the toner bottle through the predetermined angles in the forward and reverse directions.

An apparatus for stirring toner and discriminating toner bottle types according to the present invention comprises a motor for rotating a toner bottle, a motor driver for driving the motor, a sensor for sensing an object to be sensed formed in a predetermined portion of the toner bottle and outputting a sensor signal, and a CPU for controlling the motor driver and receiving the sensor signal, wherein the CPU controls the motor driver to rotate the toner bottle through a predetermined angle in a forward direction, senses the object assumed to be formed on an outer surface of the toner bottle by using the sensor, outputs information indicating abnormality if the object is not sensed, rotates the toner bottle through a predetermined angle in a reverse direction, senses the object by using the sensor, and outputs information indicating abnormality if the object is not sensed.

A toner bottle according to the present invention is so formed as to be adapted to fit the toner stirring apparatus described above.

A method of detecting the amount of remaining toner according to the present invention comprises the steps of rotating a toner bottle and sensing the rotational speed by using a sensor, and detecting the amount of remaining toner in the toner bottle on the basis of the sensed rotational speed.

Alternatively, a method of detecting the amount of remaining toner according to the present invention comprises the steps of rotating a toner bottle, sensing one end portion of an object to be sensed of the toner bottle by using a sensor, and detecting a first time interval from the timing of sensing to the timing at which the sensor senses the other end portion, detecting a second time interval from the timing at which the sensor senses the other end portion of the object to the timing at which the sensor senses the one end portion, calculating the rotational speed of the toner bottle by using the first and second time intervals, and detecting the amount of remaining toner in the toner bottle on the basis of the calculated rotational speed.

An apparatus for detecting the amount of remaining toner according to the present invention comprises a motor for rotating a toner bottle, a motor driver for driving the motor, a sensor for sensing an object to be sensed formed in a predetermined portion of the toner bottle and outputting a sensor signal, and a CPU for controlling the motor driver and detecting the amount of remaining toner by using the sensor signal, wherein the CPU controls the motor driver to rotate the toner bottle by the motor and detects the amount of remaining toner in the toner bottle on the basis of the output sensor signal from the sensor.

The CPU can control the motor driver to rotate the toner bottle by the motor, sense one end portion of the object of the toner bottle by using the sensor, detect a first time interval from the timing of sensing to the timing at which the sensor senses the other end portion, detect a second time interval from the timing at which the sensor senses the other end portion of the object to the timing at which the sensor senses the one end portion, calculate the rotational speed of the toner bottle by using the first and second time intervals, and detect the amount of remaining toner in the toner bottle on the basis of the rotational speed.

DESCRIPTION OF THE PREFERRED EMBODIMENTS

Embodiments of the present invention will be described below with reference to the accompanying drawings.

Figure 1:
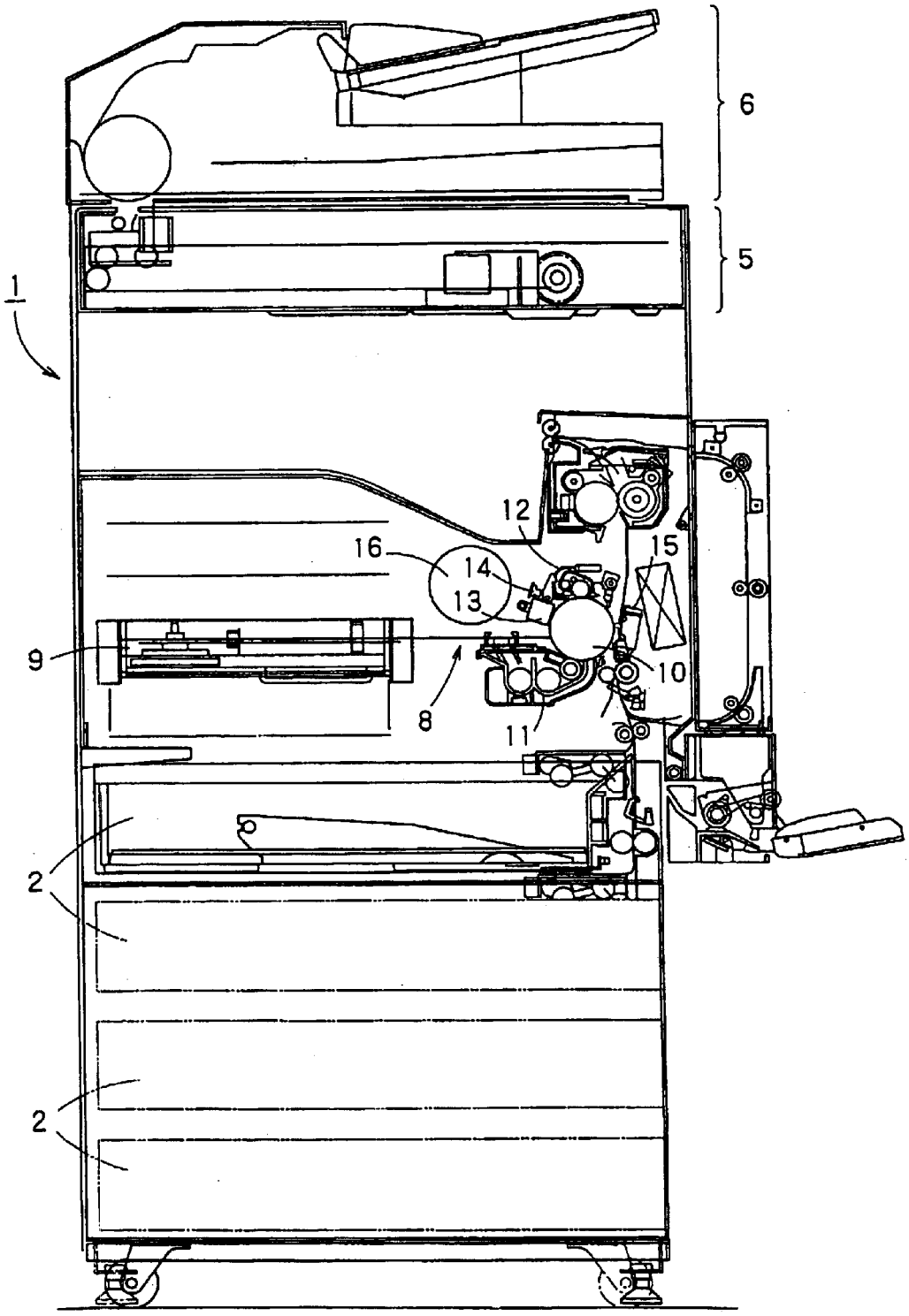
FIG. 1 is a longitudinal sectional view showing an outline of the arrangement of a whole copying machine.

FIG. 1 shows the arrangement of a whole copying machine. This copying machine 1 includes cassette paper feed units 2 containing a large number of transfer sheets in the lower portion of the machine.

The upper portion of the copying machine 1 includes an image reader 5 for reading an original, an automatic document feeder 6 for supplying an original to this image reader 5, an image storage unit (not shown) for storing image data read by the image reader 5, and a laser optical device 9 for extracting the stored image data and forming a visible image by irradiating an image forming unit 8 with a laser beam.

The image forming unit 8 is composed of a photosensitive drum 10, a developing unit 11, a cleaner 12, a charger 13, a discharge lamp 14, and a transfer/separation charger 15. The developing unit 11 has a toner bottle 16 and a driving unit for rotating the toner bottle 16.

Figure 2:
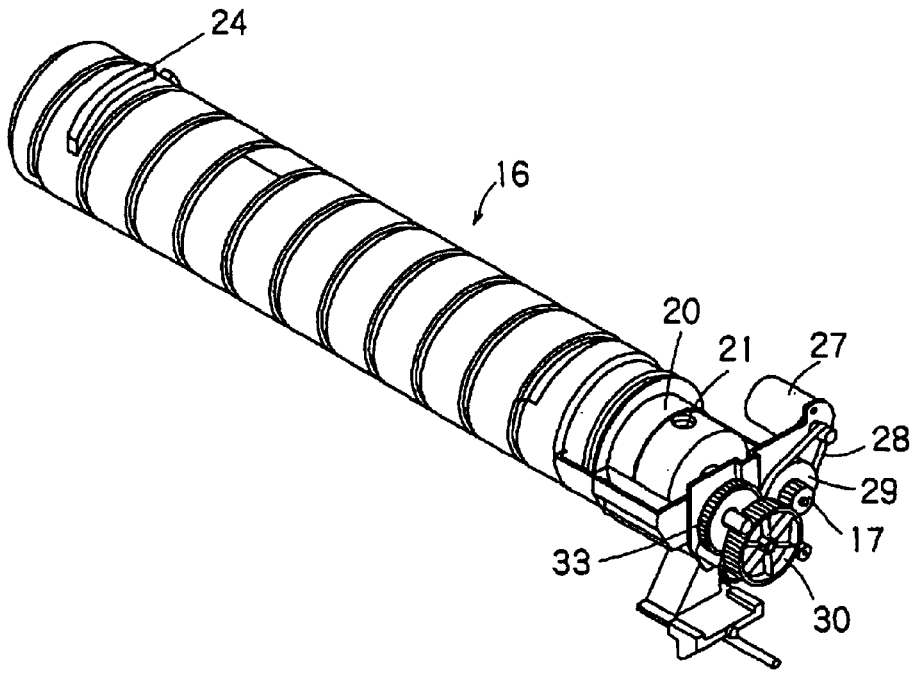
FIG. 2 is a perspective view showing a toner bottle and a driving unit in the copying machine.

FIG. 2 shows the toner bottle 16 and the driving unit 17. A cap 20 having a discharge port 21 is placed at an opening portion of the toner bottle 16. A rib 24 is formed on a portion of the outer surface at the end portion away from the opening portion of the toner bottle 16. This rib 24 has a predetermined positional relationship with the discharge port 21 of the cap 20.

Figure 3:
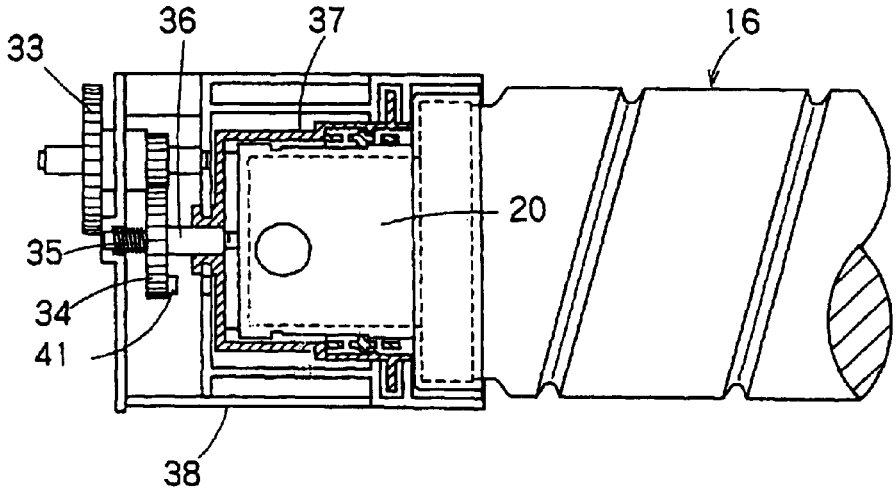
FIG. 3 is a longitudinal sectional view showing a rotating mechanism in the driving unit.

A rotating mechanism including driving gears and the like, which is a part of the driving unit 17 for rotating the toner bottle 16, will be described below with reference to FIGS. 2 and 3. Referring to FIG. 2, the driving unit 17 includes a motor 27, a pulley 29, a belt 28 for transmitting the rotation of the motor 27 to the pulley 29, a driving gear A 30 to which the rotation of the pulley 29 is transmitted, a driving gear B (not shown) to which the rotation of the driving gear A 30 is transmitted, a conveyor auger for converting the rotation of the driving gear B into linear motion, and a driving gear C 33 for converting the linear motion of the conveyor auger into rotation. Referring to FIG. 3, the driving unit 17 includes a driving gear D 34 for transmitting the rotation of the driving gear C 30, a driving plate 36 attached to the rotating shaft of the driving gear D 34, the driving gear D 34 attached to the driving plate 36 to slide along the axial direction, and a holder guide 37 attached to the driving plate 36 and rotated together with the driving plate 36 by the driving gear D 34. The developing unit 11 has the toner bottle 16 and the driving unit 17 as described above.

Figure 4:
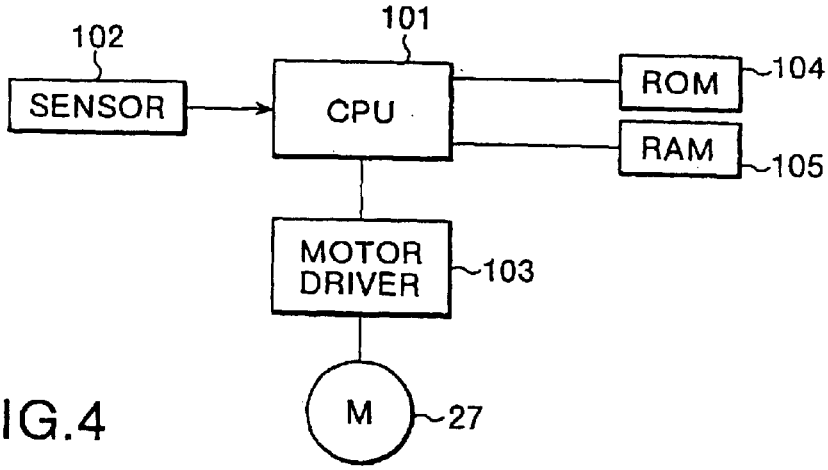
FIG. 4 is a block diagram showing the configuration of a control circuit in a toner bottle type discriminating apparatus according to the first embodiment of the present invention, a toner stirring apparatus according to the second embodiment, and a remaining toner amount detecting apparatus according to the third embodiment.

The first, second, and third embodiments of the present invention include a control circuit shown in FIG. 4 in order to control the rotation of the toner bottle 16 and perform processing such as discrimination.

This control circuit includes a CPU (Central Processing Unit) 101, a ROM 104, a RAM 105, a sensor 102, and a motor driver 103. The CPU 101 manages the whole operation of the copying machine 1. The ROM 104 stores programs for designating the operation procedure of the CPU 101. The RAM 105 stores data and data is read out from the RAM 105 where necessary under the control of the CPU 101. The sensor 102 senses the rib 24 of the toner bottle 16 and outputs a sensor signal to the CPU 101. The motor driver 103 receives a control signal from the CPU 101 and drives the motor 27 for rotating the toner bottle 16.

In accordance with the procedures to be described later with reference to flow charts, the CPU 101 outputs a control signal to the motor driver 103 and causes the motor driver 103 to drive the motor 27. The motor 27 rotates the toner bottle 16, and the sensor 102 senses the rib and outputs a sensor signal to the CPU 101. On the basis of this sensor signal, the CPU 101 discriminates the type of the toner bottle 16, controls the number of times of rotation of the toner bottle for the purpose of stirring toner, or detects the amount of remaining toner.

Figure 5:
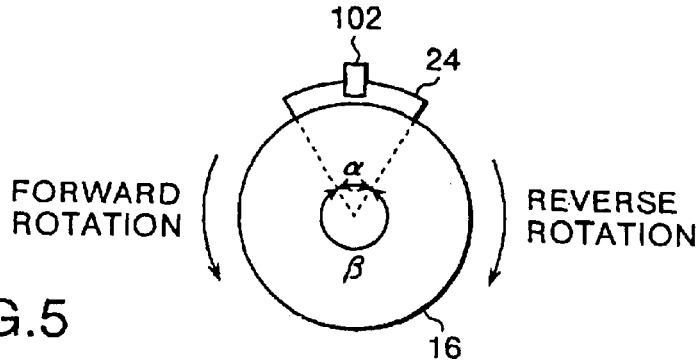
FIG. 5 is a view for explaining a toner bottle and a sensor in the apparatuses according to the first, second, and third embodiments.

First, the procedure of discrimination performed by a toner bottle type discriminating apparatus according to the first embodiment of the present invention and a toner bottle adapted to fit this discriminating apparatus will be described below. FIG. 5 shows the positional relationship between the sensor 102 and the rib 24 of the toner bottle 16. The sensor 102 can be any sensor as long as it can sense the presence of the rib 24. An optical sensor and a mechanical limit SW are examples.

It is also possible to adhere a magnetic material to the surface of a toner bottle and allow a magnetic sensor to sense this material. Alternatively, it is possible to attach an optically sensible mark such as a bar code to the surface of a toner bottle and permit an optical sensor to sense this mark. That is, it is only necessary to allow a sensor to sense a portion to be discriminated.

Let $\alpha$ be the angle at which the rib exists on the outer surface of the toner bottle 16 and $\beta$ be the angle at which it does not exist. When a spiral is cut in the outer surface of the toner bottle 16 as shown in FIG. 2, the direction in which internal toner moves changes in accordance with the rotational direction. Therefore, the rotation of the toner bottle 16 includes forward rotation and reverse rotation. The forward rotation is rotation in a direction in which toner in the toner bottle 16 moves to the opening portion. The reverse rotation is rotation in a direction in which toner moves to the end portion opposite to the opening portion.

Figure 6:
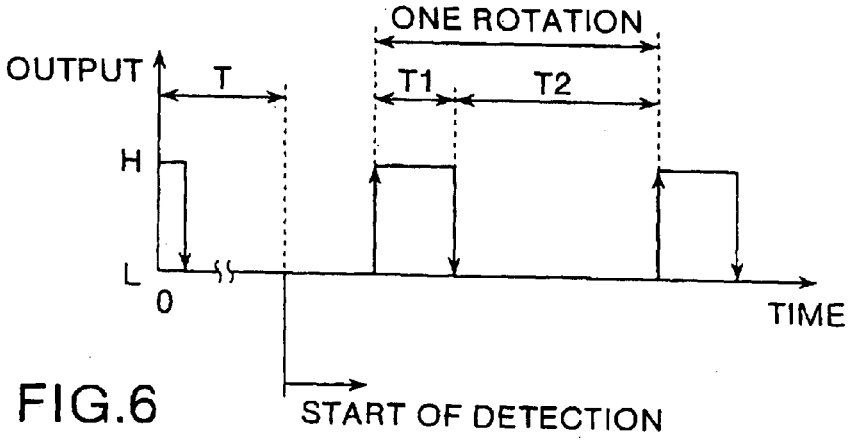
FIG. 6 is a timing chart showing an output waveform when the sensor senses a rib of the toner bottle.

FIG. 6 shows an output waveform when the sensor 102 senses the rib 24 of the toner bottle 16 during rotation (regardless of whether it is forward rotation or reverse rotation). A high level is output in a period T1 during which the sensor 102 senses the rib 24. The output changes to low level in a period T2 during which the sensor 102 does not sense the rib 24.

Figure 7:
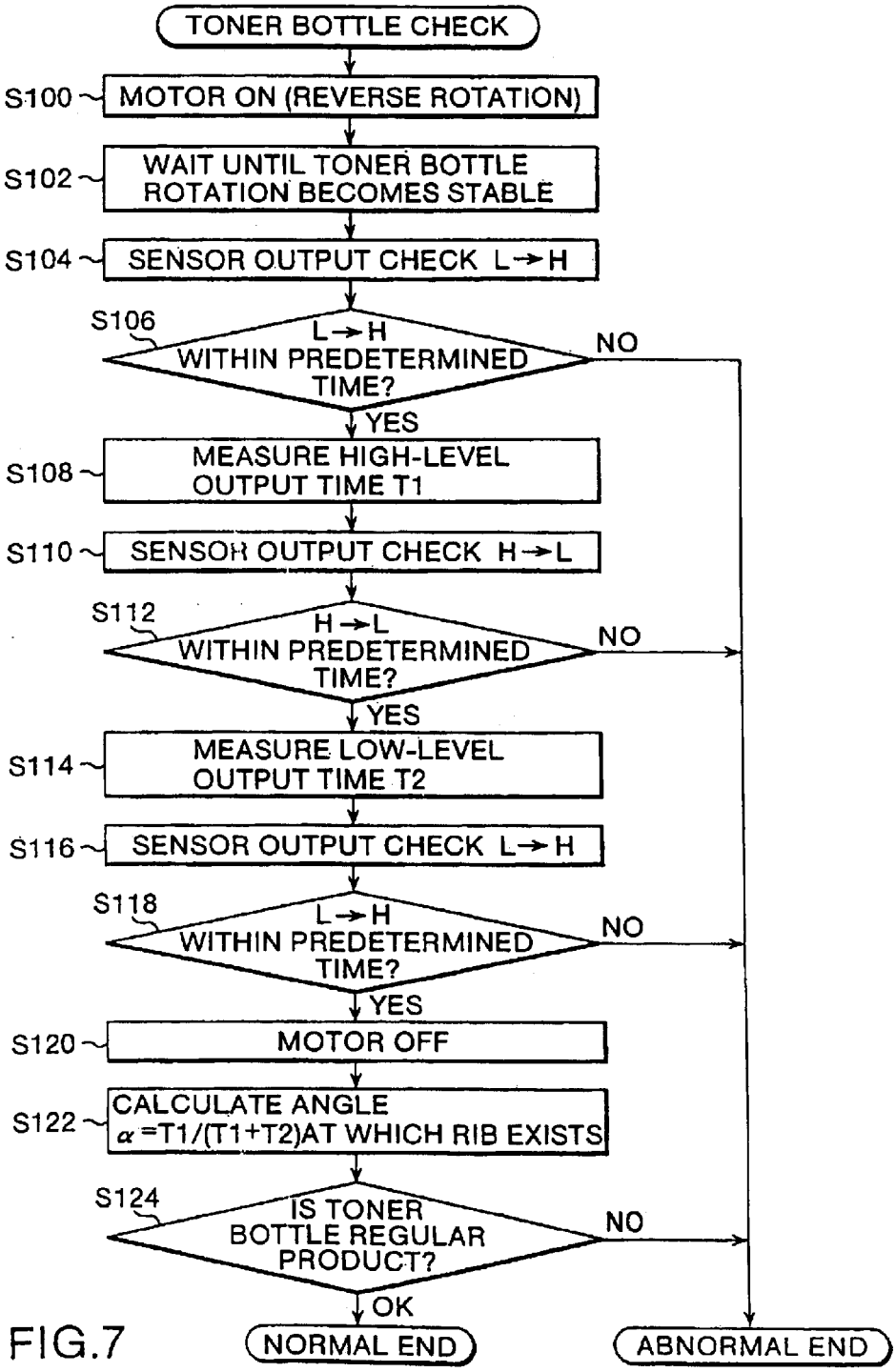
FIG. 7 is a flow chart showing the procedure of the operation of a toner bottle type discriminating method and apparatus according to the first embodiment of the present invention.

FIG. 7 shows the procedure of toner bottle discrimination according to this embodiment. In step S100, the CPU 101 starts rotating the motor 27. The direction of this rotation is the reverse direction. This is so because this operation is to discriminate whether the toner bottle is a genuine product, unlike the original toner bottle operation of replenishing toner to the developing unit, so it is necessary to prevent discharge of toner from the opening portion.

In step S102, the CPU 101 waits until the rotation of the toner bottle 16 becomes stable. During this interval, the CPU 101 does not check for the output from the sensor 102. This is so because the time required for the rotation of the motor 27 to become a constant velocity rotation changes in accordance with the amount of remaining toner in the toner bottle 16, so the CPU 101 cannot accurately measure the time of one rotation of the toner bottle. This phenomenon is significant when a brush motor is used as the motor 27.

In step S104, after the rotation of the motor 27 has become stable, the CPU 101 checks for the output from the sensor 102, thereby checking whether the output has changed from low level to high level.

In step S106, if the output from the sensor 102 has not changed from low level to high level within a predetermined time, i.e., if the rib 24 does not exist in a predetermined position of the toner bottle 16, the CPU 101 determines that this toner bottle 16 is not a genuine product, and displays information indicating abnormality on a control panel. If the output from the sensor 102 has changed from low level to high level within the predetermined time, in step S108 the CPU 101 starts measuring a time T1 during which the high-level output is maintained.

In step S110, the CPU 101 checks for the output from the sensor 102 to check whether the output has changed from high level to low level. If the CPU 101 determines in step S112 that the output has not changed from high level to low level within a predetermined time, the CPU 101 determines that the toner bottle 16 is not a genuine product, and displays information indicating abnormality on the control panel. If the output has changed from high level to low level within the predetermined time, a high-level output period T1 is determined at this point.

In step S114, the CPU 101 starts measuring a time T2 during which the output maintains low level. In step S118, the CPU 101 checks whether the output has changed from low level to high level within a predetermined time. If NO in step S118, the CPU 101 displays information indicating abnormality on the control panel. If the output has changed from low level to high level within the predetermined time, a low-level output period T2 is determined at this point.

In step S120, the rotation of the motor 27 is stopped under the control of the CPU 101.

In step S122, the CPU 101 calculates the angle α (=T1/(T1+T2)) at which the rib 24 exists by using the high-level output period T1 and the low-level output period T2.

In this embodiment, the rib angle α is detected by using the high-level output period T1 and the low-level output period T2 of the sensor as parameters, and is used as a criterion. However, various criteria can also be formed by combining the timings of the leading and trailing edges of the sensor output signal.

In step S124, the CPU 101 checks whether the calculated angle α corresponds to a genuine product. If the angle α corresponds to a genuine product, the CPU 101 determines that this toner bottle is a genuine product, and completes the process. If the angle α does not correspond to a genuine product, the CPU 101 displays information indicating abnormality on the control panel and completes the process.

In this embodiment as described above, it is possible to discriminate whether a toner bottle is a genuine product by using a simple method. Also, different toner bottle destination versions (e.g., a domestic version, a US version, and an European version) can be set by setting several different angles α.

Figure 8:
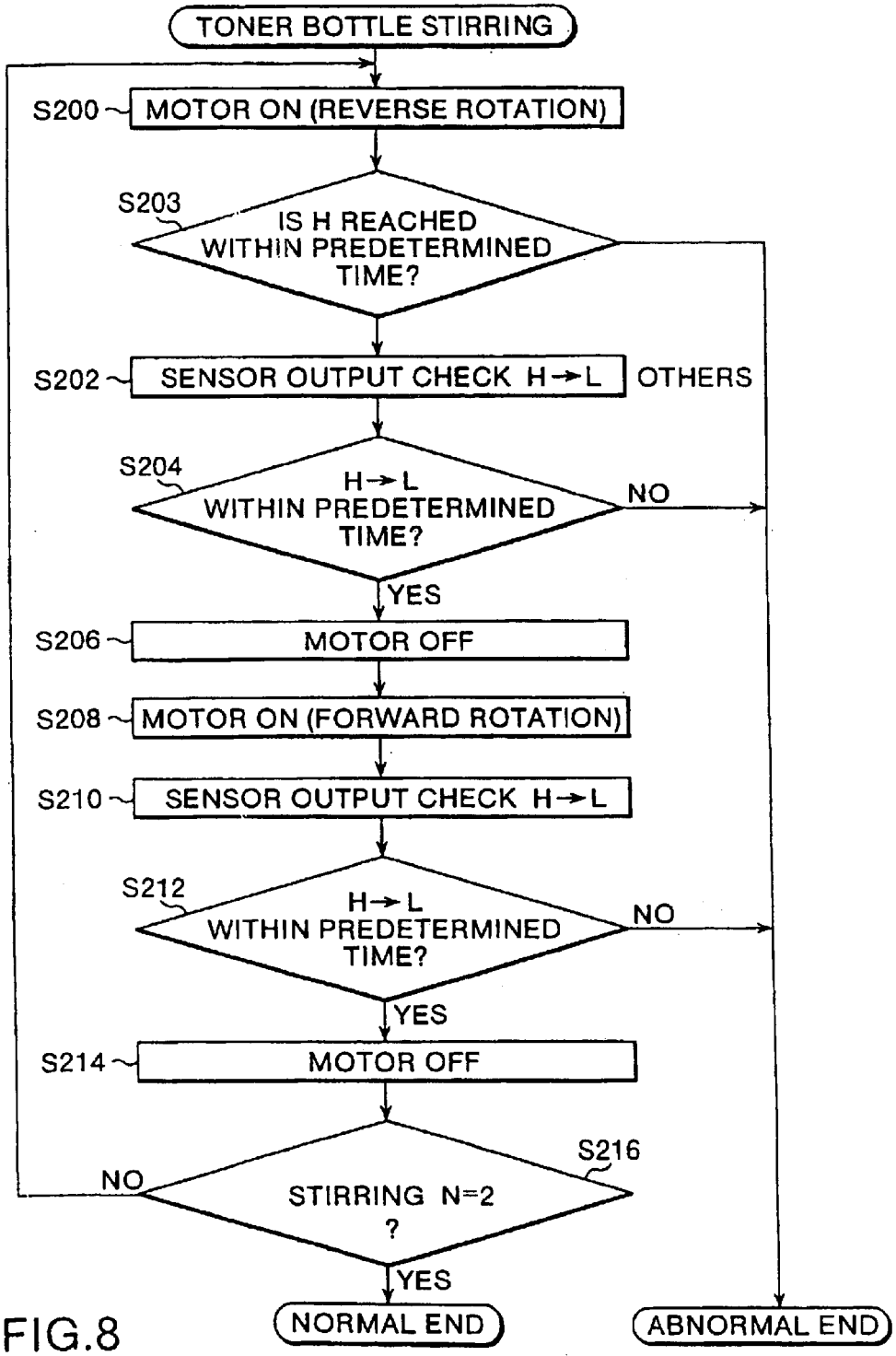
FIG. 8 is a flow chart showing the procedure of the operation of a toner stirring method and apparatus according to the second embodiment of the present invention.

A toner stirring method and apparatus and a toner bottle adapted to fit the apparatus according to the second embodiment of the present invention will be described below. FIG. 8 shows the procedure of this process. In step S200, a CPU 101 drives a motor to rotate a toner bottle 16. This first rotational direction is a reverse direction. In step S203, the CPU 101 checks whether an output has changed to high level within a predetermined time. If NO in step S203, this means that the motor is locked, so the CPU 101 abnormally terminates the process.

In step S202, the CPU 101 checks whether the output from a sensor 102 has changed from high level to low level.

In step S204, the CPU 101 checks whether the output has changed from high level to low level within a predetermined time. If NO in step S204, the CPU 101 determines that the motor is locked, and abnormally terminates the process.

If the output has changed from high level to low level within the predetermined time, the CPU 101 stops the motor in step S206.

In step S208, the CPU 101 rotates the motor in a forward direction.

In step S210, the CPU 101 checks whether the sensor output has changed from high level to low level.

In step S212, the CPU 101 checks whether the output has changed from high level to low level within a predetermined time. If NO in step S212, the CPU 101 abnormally terminates the process.

If the output has changed from high level to low level within the predetermined time, the CPU 101 stops the motor in step S214.

In step S216, the CPU 101 checks whether the stirring operation has been performed twice. If the CPU 101 determined that the stirring operation has not been performed twice, the flow returns to step S200. If the CPU 101 determines that the stirring operation has been performed twice, the CPU 101 completes the process.

In the second embodiment described above, a toner stirring process can be performed by a simple method.

The number of times of the toner stirring operation is set to 2 in this embodiment, but this number of times can be freely set. When this is the case, the desired number of times is set as a stirring number N, and the stirring operation is repeated until this number is reached in step S216.

A remaining toner amount detecting method and apparatus and a toner bottle adapted to fit the apparatus according to the third embodiment of the present invention will be described below. In this embodiment, the amount of remaining toner is detected since the load of rotation of a toner bottle changes in accordance with the amount of remaining toner in the toner bottle.

Figure 9:
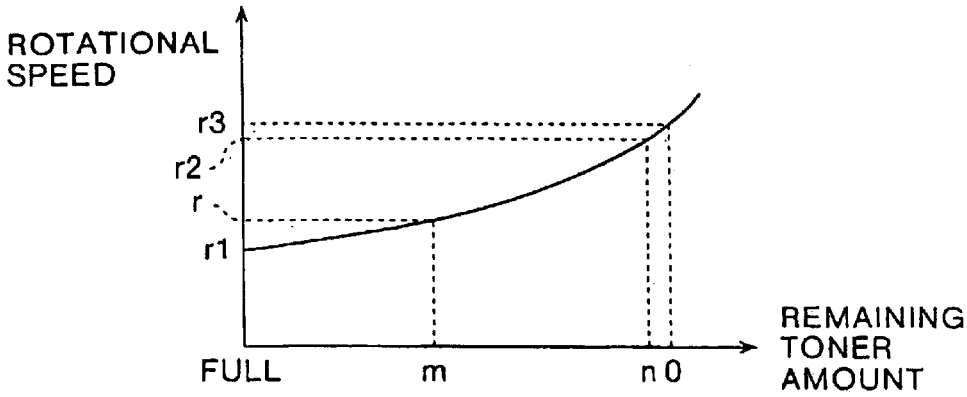
FIG. 9 is a graph showing the relationship between the remaining toner amount and the rotational speed of the toner bottle according to the third embodiment of the present invention.

FIG. 9 shows a change in the rotational speed when a toner bottle is rotated by giving it a fixed torque from the state in which the toner bottle is filled with toner to the state in which the remaining toner amount is 0 (toner empty). Let r1 be the rotational speed when the toner bottle is full, r3 be the rotational speed when the remaining toner amount is 0, and r2 be the rotational speed when the remaining toner amount is a predetermined amount n (toner near empty) (g) close to 0. Also, let r be the rotational speed obtained by rotating the toner bottle when the remaining toner amount is m (g).

Figure 10:
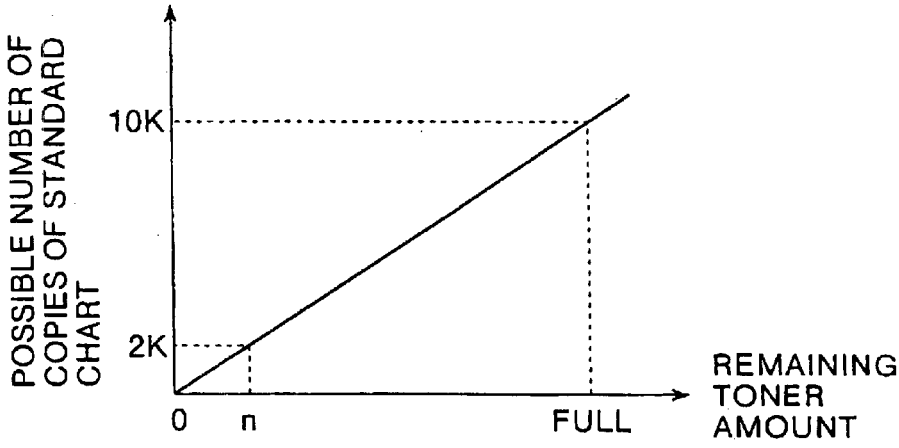
FIG. 10 is a graph showing the relationship between the remaining toner amount and the possible number of copies according to the third embodiment of the present invention.

FIG. 10 shows the relationship between the remaining toner amount and the possible number of copies when a standard chart (a chart for use in testing with which the ratio of toner necessary to copy on one transfer material is approximately 6%) is used. Assume that the possible number of copies when the toner bottle is filled with toner is, e.g., 10,000, and the possible number of copies when the remaining toner amount is n (g) is, e.g., 2,000.

On the basis of the relationship between the remaining toner amount and the rotational speed shown in FIG. 9, when the rotational speed r detected becomes higher than the rotational speed r2, it is determined that toner empty is approached, and information indicating toner empty is displayed.

Figure 11:
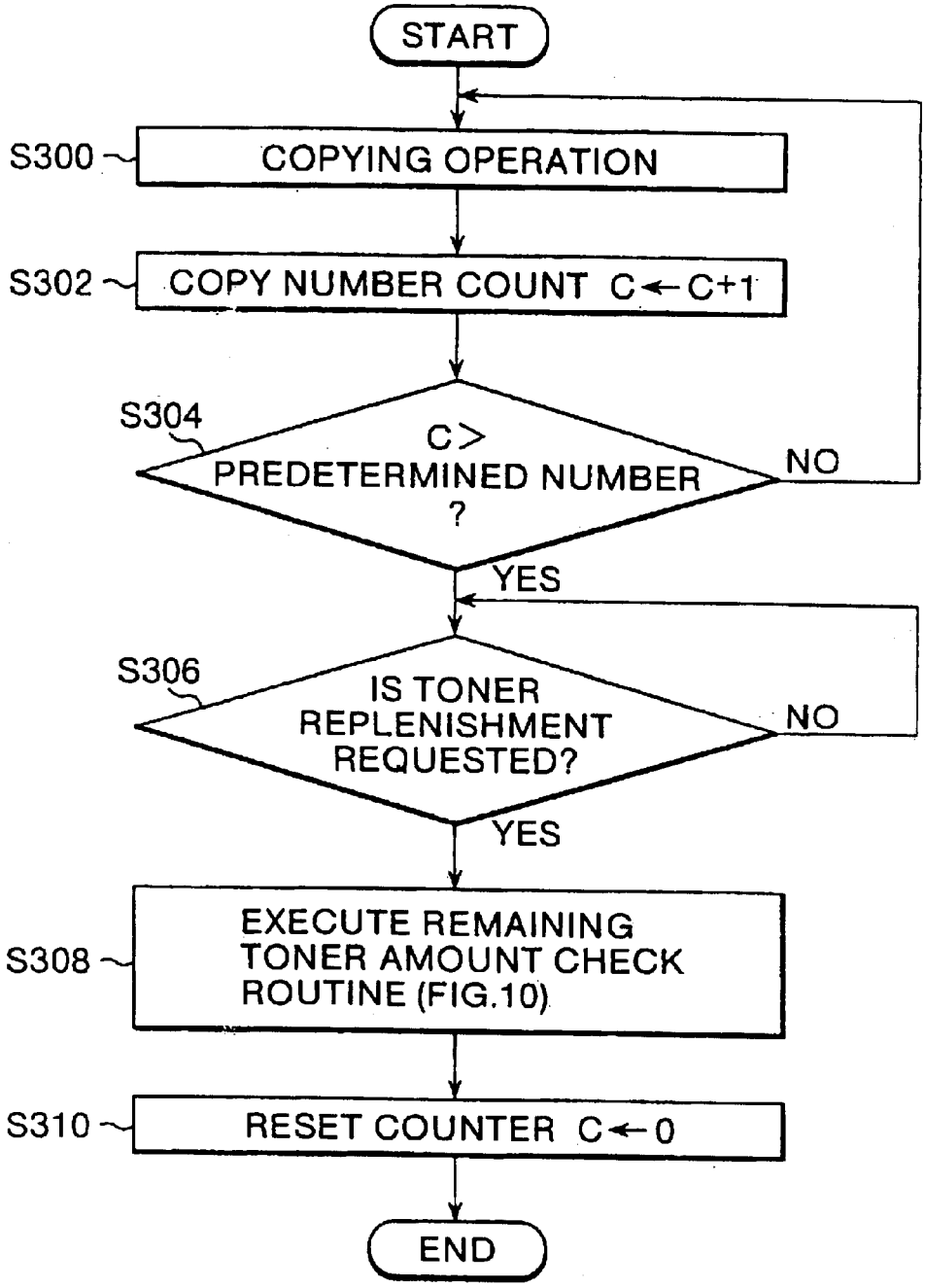
FIG. 11 is a flow chart showing the procedure of the operation of a remaining toner amount detecting method and apparatus according to the third embodiment of the present invention.
Figure 12:
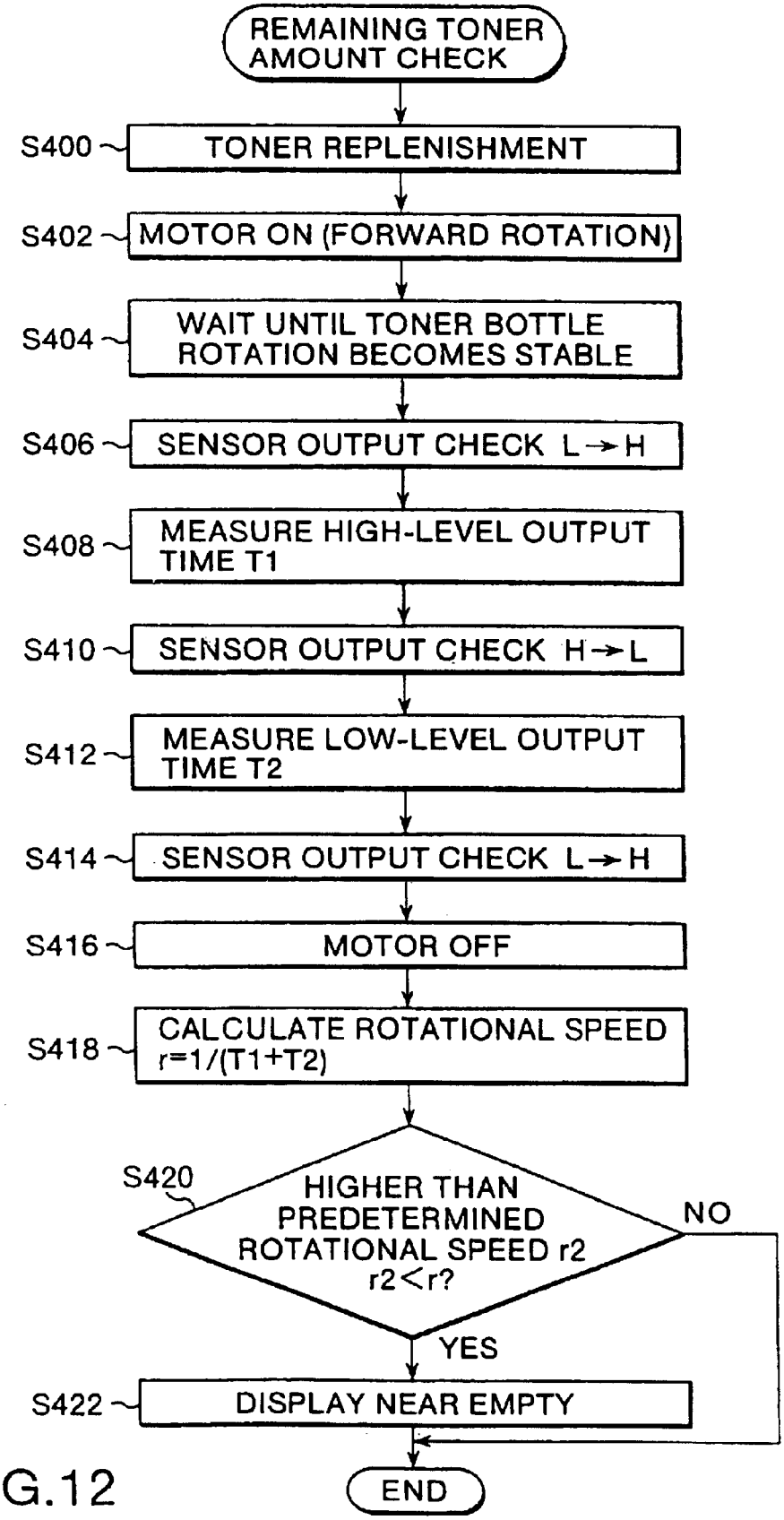
FIG. 12 is a flow chart showing the continuation of the procedure of the operation of the remaining toner amount detection method and apparatus.

FIG. 11 shows the process procedure leading to a remaining toner amount check routine. FIG. 12 shows the remaining toner amount check routine.

In step S300, a CPU 101 performs a copying operation.

In step S302, the CPU 101 counts the number of copies C for each copying.

In step S304, the CPU 101 checks whether the number of copies C exceeds a predetermined number of copies. If NO in step S304, the flow returns to step S300. If YES in step S304, the flow advances to the next step.

In step S306, the CPU 101 checks whether a developing unit has requested toner replenishment. If NO in step S306, the flow returns to step S306. If YES in step S306, the flow advances to a remaining toner amount check routine in step S308.

In step S400 of FIG. 12, the CPU 101 replenishes toner.

In step S402, the CPU 101 drives a motor 27 to rotate a toner bottle 16. The direction of this rotation is a forward direction because replenishment of toner is the purpose.

In step S404, the CPU 101 waits until the rotation of the toner bottle 16 becomes stable.

In step S406, the CPU 101 checks whether the output from a sensor 102 has changed from low level to high level.

In step S408, the CPU 101 starts measuring a time T1 during which the sensor output maintains high level.

In step S410, the CPU 101 checks whether the sensor output has changed from high level to low level. The time T1 is determined when the sensor output has changed.

In step S412, the CPU 101 starts measuring a time T2 during which the sensor output maintains low level.

In step S414, the CPU 101 checks whether the sensor output has changed from low level to high level. The time T2 is determined when the sensor output has changed.

In step S416, the CPU 101 stops the motor.

In step S418, the CPU 101 calculates the rotational speed r (=1/(T1+T2)) of the toner bottle.

In step S420, the CPU 101 checks whether the calculated rotational speed r is higher than the predetermined rotational speed r2. If the rotational speed r is equal to or lower than the predetermined rotational speed r2, the flow returns to step S310 in the flow chart of FIG. 11, and the CPU 101 resets the counter of the number of copies C and completes the process. If the rotational speed r is higher than the predetermined rotational speed r2, the flow advances to step S422, and the CPU 101 display near empty. The flow then returns to step S310 in the flow chart of FIG. 11, and the CPU 101 resets the counter of the number of copies C and completes the process.

In the third embodiment described above, the remaining toner amount can be detected in real time. Also, the remaining toner amount can be displayed in the state of near empty which is close to empty.

Each of the above embodiments is merely an example and hence does not restrict the present invention. The present invention can be modified without departing from the scope of right of the invention. For example, the outer shape of the toner bottle and the arrangement of the driving unit are not limited to those shown in FIGS. 1 to 3. Also, the shape of the rib formed on the outer surface of the toner bottle is not restricted to the one shown in FIGS. 2 to 5 and can be deformed where necessary. In the second embodiment described above, both the toner stirring process and the toner bottle type discrimination process are performed. However, only the toner stirring process can also be performed.

Furthermore, when the CPU checks whether a toner bottle is a genuine product or whether toner is near empty, the result can be displayed on a dedicated screen or a screen for operations, such as a liquid crystal display or a CRT, commonly included in a copying machine.

What is claimed is:

1. A method of discriminating toner bottle types, comprising:

the object sensing step of rotating a toner bottle, sensing an object to be sensed formed on an outer surface of said toner bottle and, if said object is not sensed, outputting information indicating abnormality; and the ratio discrimination step of checking, if said object is sensed, whether said object is formed at a predetermined ratio on the outer surface of said toner bottle, outputting information indicating abnormality if said object is not formed at the predetermined ratio, and outputting information indicating normality if said object is formed at the predetermined ratio.

2. A method according to claim 1, wherein the object ratio discrimination step comprises the steps of:

detecting a first time interval from the timing at which said sensor senses one end portion of said object of said toner bottle in rotation to the timing at which said sensor senses the other end portion;

detecting a second time interval from the timing at which said sensor senses the other end portion of said object to the timing at which said sensor senses the one end portion; and checking whether said object is formed over a predetermined length on the outer surface of said toner bottle by using the first and second time intervals.

3. A method according to claim 1, wherein the object ratio discrimination step is performed with reference to the timing at which a first end portion of said object of said toner bottle in rotation is sensed and the timing at which a second end portion of said object is sensed.

4. An apparatus for discriminating toner bottle types, comprising:

a motor for rotating a toner bottle;

a motor driver for driving said motor;

a sensor for sensing an object to be sensed formed in a predetermined portion of said toner bottle and outputting a sensor signal; and a CPU for controlling said motor driver and discriminating said toner bottle by using the sensor signal, wherein said CPU rotates said toner bottle by controlling said motor driver, senses said object assumed to be formed on an outer surface of said toner bottle by using said sensor, outputs information indicating abnormality if said object is not sensed, checks, if said object is sensed, whether said object is formed at a predetermined ratio on the outer surface of said toner bottle, outputs information indicating abnormality if said object is not formed at the predetermined ratio, and outputs information indicating normality if said object is formed at the predetermined ratio.

5. An apparatus according to claim 4, wherein in order to check whether said object is formed at the predetermined ratio on the outer surface of said toner bottle, said CPU detects a first time interval from the timing at which said sensor senses one end portion of said object of said toner bottle in rotation to the timing at which said sensor senses the other end portion, detects a second time interval from the timing at which said sensor senses the other end portion of said object to the timing at which said sensor senses the one end portion, and checks whether said object is formed at the predetermined ratio on the outer surface of said toner bottle by using the first and second time intervals.

6. A toner bottle adapted to fit an apparatus for discriminating toner bottle types, wherein said toner bottle type discriminating apparatus comprises:

a motor for rotating a toner bottle;

a motor driver for driving said motor;

a sensor for sensing an object to be sensed formed in a predetermined portion of said toner bottle and outputting a sensor signal; and a CPU for controlling said motor driver and discriminating said toner bottle by using the sensor signal, and said CPU rotates said toner bottle by controlling said motor driver, senses said object assumed to be formed on an outer surface of said toner bottle by using said sensor, outputs information indicating abnormality if said object is not sensed, checks, if said object is sensed, whether said object is formed at a predetermined ratio on the outer surface of said toner bottle, outputs information indicating abnormality if said object is not formed at the predetermined ratio, and outputs information indicating normality if said object is formed at the predetermined ratio.

7. A toner bottle according to claim 6, wherein in order to check whether said object is formed at the predetermined ratio on the outer surface of said toner bottle, said CPU detects a first time interval from the timing at which said sensor senses one end portion of said object of said toner bottle in rotation to the timing at which said sensor senses the other end portion, detects a second time interval from the timing at which said sensor senses the other end portion of said object to the timing at which said sensor senses the one end portion, and checks whether said object is formed at the predetermined ratio on the outer surface of said toner bottle by using the first and second time intervals.

8. A method of stirring toner and discriminating toner bottle types, comprising the steps of:

rotating a toner bottle through a predetermined angle in a forward direction, sensing an object to be sensed assumed to be formed on an outer surface of said toner bottle and, if said object is not sensed, outputting information indicating abnormality; and rotating said toner bottle through a predetermined angle in a reverse direction, sensing said object by using said sensor and, if said object is not sensed, outputting information indicating abnormality, wherein toner is stirred by rotating said toner bottle through the predetermined angles in the forward and reverse directions.

9. An apparatus for stirring toner and discriminating toner bottle types, comprising:

a motor for rotating a toner bottle;

a motor driver for driving said motor;

a sensor for sensing an object to be sensed formed in a predetermined portion of said toner bottle and outputting a sensor signal; and a CPU for controlling said motor driver and receiving the sensor signal, wherein said CPU controls said motor driver to rotate said toner bottle through a predetermined angle in a forward direction, senses said object assumed to be formed on an outer surface of said toner bottle by using said sensor, outputs information indicating abnormality if said object is not sensed, rotates said toner bottle through a predetermined angle in a reverse direction, senses said object by using said sensor, and outputs information indicating abnormality if said object is not sensed.

10. A toner bottle adapted to fit an apparatus for stirring toner and discriminating toner bottle types, wherein said toner stirring and toner bottle type discriminating apparatus comprises:

a motor for rotating a toner bottle;

a motor driver for driving said motor;

a sensor for sensing an object to be sensed formed in a predetermined portion of said toner bottle and outputting a sensor signal; and a CPU for controlling said motor driver and receiving the sensor signal, and said CPU controls said motor driver to rotate said toner bottle through a predetermined angle in a forward direction, senses said object assumed to be formed on an outer surface of said toner bottle by using said sensor, outputs information indicating abnormality if said object is not sensed, rotates said toner bottle through a predetermined angle in a reverse direction, senses said object by using said sensor, and outputs information indicating abnormality if said object is not sensed.

[11. A method of detecting the amount of remaining toner, comprising the steps of:

rotating a toner bottle and sensing the rotational speed by using a sensor; and detecting the amount of remaining toner in said toner bottle on the basis of the sensed rotational speed, wherein the step of sensing the rotational speed of said toner bottle comprises:

rotating said toner bottle, sensing one end portion of an object to be sensed of said toner bottle by using said sensor, and detecting a first time interval from the timing of sensing to the timing at which said sensor senses the other end portion;

detecting a second time interval from the timing at which said sensor senses the other end portion of said object to the timing at which said sensor senses the one end portion; and calculating the rotational speed of said toner bottle by using the first and second time intervals.]

[12. An apparatus for detecting the amount of remaining toner, comprising:

a motor for rotating a toner bottle;

a motor driver for driving said motor;

a sensor for sensing an object to be sensed formed in a predetermined portion of said toner bottle and outputting a sensor signal; and a CPU for controlling said motor driver and detecting the amount of remaining toner by using the sensor signal, wherein said CPU controls said motor driver to rotate said toner bottle by said motor and detects the amount of remaining toner in said toner bottle on the basis of the output sensor signal from said sensor.]

[13. An apparatus according to claim 11, wherein said CPU controls said motor driver to rotate said toner bottle by said motor, senses one end portion of said object of said toner bottle by using said sensor, detects a first time interval from the timing of sensing to the timing at which said sensor senses the other end portion, detects a second time interval from the timing at which said sensor senses the other end portion of said object to the timing at which said sensor senses the one end portion, calculates the rotational speed of said toner bottle by using the first and second time intervals, and detects the amount of remaining toner in said toner bottle on the basis of the calculated rotational speed.]

*14. A toner bottle for use with an image forming apparatus to supply toner to the image forming apparatus when the toner bottle is rotated by the image forming apparatus, the image forming apparatus having a sensor that senses the toner bottle, comprising:*

*an elongated cylindrical bottle body that houses toner, the bottle body having an edge portion and an end portion, the end portion being positioned opposite to the edge portion in an axial direction along the bottle body, and a groove extending around the outer surface of the bottle body and extending between adjacent the edge portion and adjacent the end portion;*

*a toner discharge port provided on the bottle body adjacent the edge portion, the toner being discharged from the discharge port when the toner moves toward the edge portion during toner bottle rotation; and*

*a rib having a predetermined length, the rib being provided on the outer surface of the bottle body, the rib adapted to be sensed by the sensor in the image forming apparatus during toner bottle rotation in order to judge whether the rib exists at a predetermined position and*

*extends for a predetermined ratio on the outer surface of the bottle body, to thereby discriminate toner bottle type.*

*15. The toner bottle according to claim 14, wherein the rib extends in a circumferential direction along the outer surface of the bottle body.*

*16. The toner bottle of claim 15, wherein the rib is formed at a predetermined position on the bottle body relative to the toner discharge port, the rib being aligned with the toner discharge port in an axial direction along the bottle body.*

*17. The toner bottle according to claim 14, wherein the rib faces the sensor in the image forming apparatus during rotation of the toner bottle.*

*18. An image forming apparatus in combination with the toner bottle according to claim 14, the image forming apparatus comprising:*

*a motor for rotating the toner bottle;*

*a motor driver for driving the motor;*

*a sensor for sensing the rib of the toner bottle and outputting a sensor signal; and*

*a CPU that controls the motor driver and discriminates the toner bottle using the sensor signal,*

*wherein the CPU rotates the toner bottle by controlling the motor driver, senses the rib using the sensor, outputs information indicating abnormality if the rib is not sensed by the sensor,*

*checks, if the rib is sensed, whether the rib has the predetermined ratio on the outer surface of the bottle body, outputs information indicating abnormality if the rib does not extend for the predetermined ratio, and outputs information indicating normality if the rib extends for the predetermined ratio.*

*19. The image forming apparatus in combination with the toner bottle according to claim 18,*

*wherein in order to check whether the rib extends for the predetermined ratio on the outer surface of the bottle body,*

*the CPU detects a first time interval that is based on when the sensor senses a first rib end portion of the rib during toner bottle rotation to when the sensor senses a second rib end portion,*

*detects a second time interval that is based on when the sensor senses the second rib end portion of the rib during toner bottle rotation to when the sensor senses the first rib end portion, and*

*checks whether the rib extends for the predetermined ratio on the outer surface of the bottle body based on the first and second time intervals.*

*20. The image forming apparatus in combination with the toner bottle according to claim 18, wherein the CPU controls the motor driver to stop rotation of the toner bottle when the sensor finishes sensing the rib.*

*21. A method of discriminating toner bottle types, comprising the steps of:*

*providing a toner bottle, the toner bottle comprising:*

*an elongated cylindrical body portion having an outer surface,*

*at least one groove extending around the outer surface of the cylindrical body portion,*

*a first end portion at a first end of the cylindrical body portion,*

*a second end portion at a second end of the cylindrical body portion opposite the first end portion in an axial direction along the cylindrical body portion,*

*a toner discharge port positioned at the first end portion, and*

*a rib formed on an outer surface of the toner bottle;*

*rotating the toner bottle in an image forming apparatus;*

*sensing, using a sensor in the image forming apparatus, the rib while rotating the toner bottle and, if the rib is not sensed, outputting information indicating abnormality; and*

*discriminating toner bottle type by checking, if the rib is sensed, whether the rib extends for a predetermined ratio on the outer surface of the toner bottle, outputting information indicating abnormality if the rib does not extend for the predetermined ratio, and outputting information indicating normality if the rib extends for predetermined ratio.*

*22. The method of claim 21, wherein the step of discriminating toner bottle type comprises:*

*detecting, during the step of rotating the toner bottle, a first time interval that is based on when the sensor senses a first rib end portion of the rib to when the sensor senses a second rib end portion,*

*detecting, during the step of rotating the toner bottle, a second time interval that is based on when the sensor senses the second rib end portion of the rib to when the sensor senses the first rib end portion, and*

*checking whether the rib extends for the predetermined ratio on the outer surface of the toner bottle based on the first and second time intervals.*

*23. The method of claim 21, wherein the rib is positioned at a predetermined position on the toner bottle relative to the toner discharge port, and the rib is axially aligned with the toner discharge port in a direction along the cylindrical body portion.*

*24. The method of claim 21, wherein the rib extends circumferentially for a predetermined angle relative to the outer surface of the cylindrical body portion.*

*25. The toner bottle of claim 6, wherein the toner bottle further comprises:*

*an elongated cylindrical body portion having an outer surface;*

*at least one groove extending around the outer surface of the cylindrical body portion;*

*a first end portion at a first end of the cylindrical body portion;*

*a second end portion at a second end of the cylindrical body portion opposite the first end portion in an axial direction along the cylindrical body portion; and*

*a toner discharge port positioned at the first end portion,*

*wherein the object is formed at the second end portion.*

*26. The toner bottle of claim 25, wherein the object is a rib.*

*27. The toner bottle of claim 26, wherein the rib is formed at a predetermined position on the toner bottle relative to the toner discharge port.*

*28. The toner bottle of claim 27, wherein the toner discharge port is aligned with the rib in an axial direction along the cylindrical body portion.*

*29. The toner bottle of claim 28, wherein the first end portion has a diameter smaller than a diameter of the cylindrical body portion.*

*30. The toner bottle of claim 26, wherein the groove is a spiral groove that extends from adjacent the second end portion to adjacent the first end portion.*

*31. The toner bottle of claim 30, wherein the spiral groove extends continuously without breaks from adjacent the second end portion to adjacent the first end portion.*

*32. The toner bottle of claim 31, wherein the continuous spiral groove comprises a plurality of groove portions that extend parallel to one another in a direction circumferentially along the outer surface of the cylindrical body portion.*

*33. The toner bottle of claim 32, wherein the plurality of groove portions comprises a first groove portion, a second groove portion, and a third groove portion, wherein a first distance between the first groove portion and the second groove portion is equal to a second distance between the second groove portion and the third groove portion.*

*34. The toner bottle of claim 33, wherein the toner discharge port is positioned on an outer circumferential surface of the first end portion.*

* * * * *